United States Patent
Kells et al.

(10) Patent No.: US 12,534,418 B2
(45) Date of Patent: Jan. 27, 2026

(54) UREA CALCIUM SULFATE GRANULES AND METHODS FOR PRODUCING AND USING THE SAME

(71) Applicant: SABIC AGRI-NUTRIENTS COMPANY, Riyadh (SA)

(72) Inventors: Andrew George Kells, Wilton (GB); Nilkamal Bag, Bangalore (IN); Saleh Nafe Al-Shammari, Riyadh (SA)

(73) Assignee: SABIC AGRI-NUTRIENTS COMPANY, Jubail (SA)

( * ) Notice: Subject to any disclaimer, the term of this patent is extended or adjusted under 35 U.S.C. 154(b) by 981 days.

(21) Appl. No.: 17/762,813

(22) PCT Filed: Aug. 27, 2020

(86) PCT No.: PCT/IB2020/058018
§ 371 (c)(1),
(2) Date: Mar. 23, 2022

(87) PCT Pub. No.: WO2021/064488
PCT Pub. Date: Apr. 8, 2021

(65) Prior Publication Data
US 2022/0402832 A1 Dec. 22, 2022

Related U.S. Application Data (60) Provisional application No. 62/910,167, filed on Oct. 3, 2019.

(51) Int. Cl.
*C05C 9/02* (2006.01)
*C05G 5/12* (2020.01)
*C05G 5/30* (2020.01)

(52) U.S. Cl.
CPC .......... *C05C 9/02* (2013.01); *C05G 5/12* (2020.02); *C05G 5/38* (2020.02)

(58) Field of Classification Search
CPC .... C05C 9/02; C05G 5/12; C05G 5/35; C05G 5/38
See application file for complete search history.

(56) References Cited

U.S. PATENT DOCUMENTS

| 1,367,846 A | | 2/1921 | Washburn |
| 2,074,880 A | * | 3/1937 | Whittaker ............ C05C 9/00 71/28 |

(Continued)

FOREIGN PATENT DOCUMENTS

| AU | 200118807 | 6/2001 |
| AU | 2012250293 | 12/2012 |

(Continued)

OTHER PUBLICATIONS

Hearing Notice issued in corresponding Indian Application No. 202017005165, dated Mar. 7, 2023.

(Continued)

*Primary Examiner* — Wayne A Langel
(74) *Attorney, Agent, or Firm* — NORTON ROSE FULBRIGHT US LLP (57) ABSTRACT

A urea calcium sulfate (UCS) fertilizer granule and methods for making and using the same are disclosed. The granule can include a urea-calcium sulfate (UCS) adduct. The method of making can include producing a partially dried material comprising UCS adduct and forming the UCS fertilizer granules by either one or both of feeding the partially dried material into a separate vessel for granulation or granulating after storage of the partially dried material.

17 Claims, 5 Drawing Sheets

(56) References Cited

U.S. PATENT DOCUMENTS

| | | | |
|---|---|---|---|
| 2,157,541 | A | 5/1939 | Hosokawa |
| 3,419,379 | A | 12/1968 | Goodale et al. |
| 3,925,053 | A | 12/1975 | Kealy |
| 3,935,298 | A | 1/1976 | Sugahara |
| 3,976,467 | A | 8/1976 | Seferian et al. |
| 4,019,889 | A | 4/1977 | Kealy |
| 4,175,943 | A | 11/1979 | Jordaan et al. |
| 4,283,423 | A | 8/1981 | Watkins et al. |
| 4,352,688 | A | 10/1982 | Ott |
| 4,478,632 | A | 10/1984 | Van Hijfte et al. |
| 4,507,139 | A | 3/1985 | Sullivan et al. |
| 5,264,017 | A | 11/1993 | Van de Walle |
| 5,409,516 | A | 4/1995 | Achard et al. |
| 5,716,591 | A | 2/1998 | Crispoldi |
| 5,917,110 | A | 6/1999 | Kust |
| 7,258,848 | B1 | 8/2007 | Blackwell et al. |
| 11,299,441 | B2 | 4/2022 | Kiiski et al. |
| 11,352,306 | B2 | 6/2022 | Kells et al. |
| 11,802,096 | B2 | 10/2023 | Kiiski et al. |
| 11,912,634 | B2 | 2/2024 | Kells et al. |
| 2003/0073580 | A1 | 4/2003 | Runkis et al. |
| 2004/0031303 | A1 | 2/2004 | Whitehurst et al. |
| 2005/0144997 | A1 | 7/2005 | Phillips et al. |
| 2016/0075607 | A1 | 3/2016 | Aqel et al. |
| 2018/0297903 | A1 | 10/2018 | Ledoux et al. |
| 2020/0148607 | A1 | 5/2020 | Kiiski et al. |

FOREIGN PATENT DOCUMENTS

| | | | | |
|---|---|---|---|---|
| CN | 1063095 | | 7/1992 | |
| CN | 1463955 | | 12/2003 | |
| CN | 101041603 | | 9/2007 | |
| CN | 1894172 | | 10/2007 | |
| CN | 101519324 | | 9/2009 | |
| CN | 101798240 | | 8/2010 | |
| CN | 102167650 | | 8/2011 | |
| CN | 103086781 | | 5/2013 | |
| CN | 103819271 | | 5/2014 | |
| CN | 103086810 | | 5/2015 | |
| CN | 104768901 | | 7/2015 | |
| CN | 104803736 | | 7/2015 | |
| CN | 106748017 A | * | 5/2017 | ............ C05B 17/00 |
| CN | 108349827 | | 7/2018 | |
| CN | 108530175 | | 9/2018 | |
| DE | 3816570 | | 11/1989 | |
| DE | 29809124 | | 9/1999 | |
| EP | 0988105 | | 3/2000 | |
| EP | 2774907 | | 9/2014 | |
| EP | 3210959 | | 8/2017 | |
| EP | 3372576 | | 9/2018 | |
| EP | 3374332 | | 9/2018 | |
| EP | 3419953 | | 1/2019 | |
| EP | 3436416 | | 2/2019 | |
| EP | 3571174 | | 11/2019 | |
| FR | 2676730 | | 11/1992 | |
| FR | 2684372 | | 6/1993 | |
| FR | 2745564 | | 9/1997 | |
| GB | 492387 | | 9/1938 | |
| GB | 624642 | | 6/1949 | |
| GB | 822939 | | 11/1959 | |
| GB | 921247 | | 3/1963 | |
| GB | 1189398 | | 4/1970 | |
| GB | 1211537 A | | 11/1970 | |
| GB | 159854 | | 12/2021 | |
| IL | 133429 | | 1/2001 | |
| KR | 2003062520 A | | 7/2003 | |
| KR | 20100004615 A | * | 1/2010 | ............... C05G 5/35 |
| PL | 206964 | | 10/2010 | |
| PL | 229915 B1 | | 9/2018 | |
| RO | 111183 | | 7/1996 | |
| SU | 1063800 | | 12/1983 | |
| SU | 1724655 | | 4/1992 | |
| WO | WO 1998/055213 | | 12/1998 | |
| WO | WO 2000/000452 | | 1/2000 | |
| WO | WO 2001/021556 | | 3/2001 | |
| WO | WO 2001/042172 | | 6/2001 | |
| WO | WO 2004/000759 | | 12/2003 | |
| WO | WO 2011/137393 | | 11/2011 | |
| WO | WO 2017/081183 | | 5/2017 | |
| WO | WO 2018/162533 | | 9/2018 | |
| WO | WO 2019/016761 | | 1/2019 | |
| WO | WO 2019/016763 | | 1/2019 | |
| WO | WO 2019/040427 | | 2/2019 | |
| WO | WO 2019/215271 | | 11/2019 | |
| WO | WO 2020/104916 | | 5/2020 | |
| WO | WO 2020/115698 | | 6/2020 | |

OTHER PUBLICATIONS

Jing'an et al., Production Process Technology. 1$^{st}$ ed., Chemical Industry Press, 2000 pp. 317-319 (English Translation of relevant parts provided).

Office Action and Search Report issued in Corresponding Chinese Application No. 202080078509.1, dated Oct. 21, 2022 (English translation provided).

Yunfeng et al., *New Food Processing Technology and Application*. 1$^{st}$ ed., China Atomic Energy Press, 2018, pp. 52-53 (English Translation of relevant parts provided).

Office Action issued in Corresponding Chinese Application No. 202080061008.2, dated Aug. 18, 2022 (English Translation provided).

Office Action issued in Corresponding Brazilian Application No. BR112020001068-5, dated May 18, 2022 (No English Translation provided).

Achard, et al., "A new route for urea-superphosphate fertilizers," *Phosphorus and Potassium*, 1994, 191:27-33.

Akhavan-Kharazian et al., "Effects of CaSO4, CaCl2, and NaCl on leaf nitrogen, nodule weight, and acetylene reduction activity in Phaseolus vulgaris L.," *Arid Soil Research and. Rehabilitation.*, 1991, 5(2):97-103.

Aldrich et al., "Gypsum and other sulfur materials for soil conditioning," *California Agricultural Experiment Station Publications*, 1951, Circular No. 403.

Alva et al., "Role of calcium in amelioration of copper phytotoxicity for citrus," *Soil Science*, 1993, 155:211-218.

Bayrakli "Ammonia volatilization losses from different fertilizers and effect of several urease inhibitors, CaCl2 and phosphogypsum on losses from urea," *Fertilizer Research*, 1990, 23(3):147-150.

Biskupski et al., "Influence of different level of nitrogen fertilization on yielding and selected indices of canopy architecture in several spring wheat cultivars" Pamietnik Pulawski 2006, 142, 31-41.

Borowik, M., et al.: Production technology of nitrogen-sulphur-calcium fertilizers on the base of urea and phosphogypsum, Chemik 66, 525-540. (2012).

Burt et al. "Flue-gas desulfurization gypsum effects on urea-degrading bacteria and ammonia volatilization from broiler litter." *Poultry Science*, 2017, 96(8):2676-2683.

De Villiers, et al. "Crystal structure of calcium sulfate-urea complex," *Journal of Crystal and Molecular Structure*, 1975; 5(4):215-226.

Dhiman, "Lecture 20 Single Superphosphate," Department of Chemical EngineeringIIT Roorkee, 2012, https://nptel.ac.in/courses/103/107/103107086/.

Epstein, "The essential role of calcium in selective cation transport by plant cells," *Plant Physiology*, 1961, 36(4):437-444.

Evangelou et al., "Mechanisms of "basic metals"—ammonia interactions: Field implications," Agronomy Abstracts, 1999, 199.

Fenn et al., "Calcium stimulation of ammonium absorption in onion," *Agronomy Journal*, 1991, 83:840-843.

Fenn et al., "Influence of plant age on calcium stimulated ammonium absorption by radish and onion." *Journal of Plant Nutrition*, 1993, 16(7):1161-1177.

Firsova, "Strength of Granules Based on Calcium Sulfate Crystal Solvates," *Moscow University Chemistry Bulletin*, 2010, 65(4):274-278.

Frame, et al. "In Vitro Evaluation of Coatings to Control Ammonia Volatilization from Surface-Applied Urea," *Agronomy Journal*, 2012, 104(5):1201. (Abstract Only).

(56) References Cited

OTHER PUBLICATIONS

Frazier, et al., "Urea-Monocalcium Phosphate, a Component of Mixed Fertilizers," *Journal of Agriculture and Food Chemistry*, 1967, 15(2):345-347.
Hakeem, et al., "Reactive Nitrogen Inflows and Nitrogen use Efficiency in Agriculture: An Environment Perspective," *Environmental Adaptions and Stress Tolerance of Plants in the Era of Climate Change*, 2012, 10:217-232.
International Search Report and Written Opinion for Application No. PCT/IB2020/056346, mailed Oct. 2, 2020, 13 pages.
International Search Report and Written Opinion for Application No. PCT/IB2020/058018, mailed Nov. 18, 2020.
International Search Report and Written Opinion issued in Corresponding PCT Application No. PCT/IB2021/055807, dated Oct. 28, 2021.
International Search Report and Written Opinion issued in International Application No. PCT/IB2018/055397, dated Oct. 9, 2018.
International Search Report and Written Opinion issued in International Patent Application No. PCT/IB2018/055399, dated Oct. 12, 2018.
Jones, "Ammonia Volatilization: Process, Amounts, and Effects on Yield and Protein" *Montana State University College of Agriculture & Montana Agricultural Experiment Station*, Created for the Web, 2017.
Jones, et al., "Critical Ca Levels and Ca/Mg rations in Trifolium subterraneum L. grown on serpentine sofl-.," *Agron. J.*, 1976, 68:756-759.
Khan et al., "Comparative effects of urea plus gypsum and urea plus ammonium sulphate on growth, yield and nutrition in canola cropping system in calcarosol of south-eastern Australia," *Proceedings of the 5th Joint Australian and New Zealand Soil Science Conference: Soil solutions for diverse landscapes*, 2012, 480.
Kirkby, "Maximizing calcium uptake by plants," Communications in Soil Science and Plant Analysis, 1979, 10(1-2):89-113.
Kotula, E., & Nowak, R.: Calcium sulphate tetraureaate—nitrogen-sulfur-calcium-fertilizer as an alternative to phosphogypsum utilization. Scientific works of the Szczecin University of Technology, Institute of Inorganic Technology. (1998), 547, 91-96.
Malinowski P., et al.: "Preparation methods of calcium sulphate and urea adduct." Polish Journal of Chemical Technology 9.4 (2007): 111-114.
Malinowski P., et al.: "Utilization of waste gypsum in fertilizer production." Polish Journal of Chemical Technology, 16, 1, 45-47, 10. (2014).
Muneer, et al., "The role of calcium-organic interactions in soil aggregate stability .III .. Mechanisms and models," *Australian Journal of Soil Research.*, 1989, 27:411-423.
Oenema et al., "Ammonia volatilization from compound nitrogen-sulfur fertilizers." *Optimization of Plant Nutrients*, 1993:341-349.
Office Action and Search Report issued in Corresponding Chinese Application No. 201980086833.5, dated Jan. 11, 2022 (English Translation provided).
Office Action issued in Corresponding Chinese Application No. 201880058201.3, dated Aug. 27, 2021 (English Translation provided).
Paroisse, "A new route for urea superphosphate fertilizers," *Phosphorous and Potassium*, 1994, 191, 27.
Podleśna, "Yielding Effect of Nitrogen and Sulfur At Pot Experiment Conditions With Winter Wheat," *Ecological Chemistry and Engineering A*, 2011, 18(3):401-405.
Prochnow et al., "Controlling ammonia losses during manure composting with the addition of phosphogypsum and simple superphosphate." *Sci. agric. (Piracicaba, Brazil)*, 1995; 52(2):346-349.
Ridzwan et al., "Comparative performance of different urea coating materials for slow release" Particuology, 2014, 17:165-172.
Scott, et al., "Application of calcium to soil and cultivar affect elemental concentration of watermelon leaf and rind tissue," *Journal of the American Society for Horticultural Science*, 1993, 118(2):201-206.
Shainberg, et al., "Use of gypsum on soils: A review," *Advances in Soil Science*, 1989, 9:1.
Sharma et al. "Ammonia Volatilization as Influenced by Amendments in a Light Textured Alkali Soil" *Annals of Arid Zone 33*, 1991; 3:203-207.
Smyth, et al., "Aluminum and calcium constraints to continuous crop production in a Brazilian Amazon Oxisol.," *Agronomy Journal*, 1992, 84:843-850.
Vashishtha, et al., "Improvement in properties of urea by phosphogypsum coating," *International Journal of ChemTech Research*, 2010, 2(1):36-44.
Whittaker, et al., "Reaction between Urea and Gypsum," *Industrial and Engineering Chemistry*, 1933, 25(11):1280-1282.
Zia et al., "Ammonia volatilization from nitrogen fertilizers with and without gypsum." *Soil Use and Management*, 1999, 15: 133-135.
International Search Report and Written Opinion issued in Corresponding PCT Application No. PCT/IB2019/060479, dated Feb. 25, 2020.
Guo Rui MA, "Hundreds Questions and Answers on the Efficient Use of Fertilizers", China Agriculture Press, Jan. 2006, 1st edition, p. 61. (English Translation).
Nian Zhu HE, "Fertilizer Manufacturing and Processing", Shanghai Science and Technology Press, Apr. 1998, 1st edition, pp. 264-265. (English Translation).
Xiang Zhao GAO et al., "Fertilizer Handbook", China Agriculture Press, Sep. 2000, 1st edition, pp. 194-195.(English Translation).
"Role of sulfur in plant culture", *PT Growers and Consumers*, Jun. 3, 2014. Retrieved from the Internet: URL:https://www.pthorticulture.com/en-us/training-center/role-of-sulfur-in-plant-culture.
Buechel, T. "Role of calcium in plant culture", *PT Growers and Consumers*, Jun. 3, 2014. Retrieved from the Internet: <URL: https://www.pthorticulture.com/en-us/training-center/role-of-calcium-in-plant-culture>.
McKee, S. "Best methods for applying granular plant food", *Dave's Garden*, 2017. Retrieved from the Internet: <URL: https://davesgarden.com/guides/articles/best-methods-for-applying-granular-plant-food>.

* cited by examiner

UREA CALCIUM SULFATE GRANULES AND METHODS FOR PRODUCING AND USING THE SAME

CROSS REFERENCE TO RELATED APPLICATIONS

This application is a national phase application under 35 U.S.C. § 371 of International Application No. PCT/IB2020/058018, filed Aug. 27, 2020, which claims the benefit of priority of U.S. Provisional Patent Application No. 62/910,167 filed Oct. 3, 2019, the entire contents of each of which are hereby incorporated by reference in its entirety.

BACKGROUND OF THE INVENTION

A. Field of the Invention

The invention generally concerns a urea calcium sulfate (UCS) fertilizer granule and methods for making and using the same. The granule can include a urea-calcium sulfate (UCS) adduct. The method of making can include producing a partially dried material comprising a UCS adduct and forming the UCS fertilizer granule by either one or both of feeding the partially dried material into a separate vessel for granulation or granulating after storage of the partially dried material.

B. Description of Related Art

Soil nutrients, such as nitrogen, phosphorus, potassium, and sulfur, as well as trace elements such as iron, zinc, copper, and magnesium, are useful for achieving thriving agriculture and growth of plants. Upon repeated planting cycles, the quantity of these nutrients in the soil may be depleted, resulting in inhibited plant growth and decreased production. To counter this effect, fertilizers have been developed to help replace the depleted vital nutrients. Single-nutrient fertilizers and multi-nutrient fertilizers, such as fertilizer blends, have been developed to meet the varied needs of crop production worldwide.

Fertilizers containing nitrogen are used to support healthy plant growth and photosynthesis. Urea ($CH_4N_2O$) is a compound that contains nitrogen and is widely used as a nitrogen source in fertilizers. However, due to its rapid hydrolysis and nitrification in the soil, nitrogen from urea can be quickly lost. Also, using urea in fertilizer blends that contain other soil nutrients is difficult, as urea can undesirably react with other components in the fertilizer, such as organic fertilizers. These reactions can produce water that liquefies solid granules or dry mixture products, cause clumping and loss of product, and increase the rate at which these undesirable reactions take place. See Biskupski et al. (EP 2,774,907); see also Achard et al. (U.S. Pat. No. 5,409,516). Further, the production of water increases the amount of water that has to be removed during production of urea containing fertilizers, making these blended fertilizers difficult and more expensive to make. See Schwob (FR 2,684,372).

Some of the problems with using urea in fertilizers have been reduced by binding urea to calcium sulfate as a calcium sulfate urea adduct (UCS) or reacting urea with rock phosphate and sulfuric acid to form urea associated with superphosphate (monocalcium phosphate; $Ca(H_2PO_4)_2$) and/or dicalcium phosphate ($CaHPO_4$) (see WO2001/042172, WO2019/016761, CN108530175, CN103086781, CN103086810. EP2774907, U.S. Pat. Nos. 2,074,880, 4,283,423, 5,409,516. GB1189398. Achard et al. *Phosphorus and potassium* 191 (1994): 27-33. Whittaker et al. *Ind. Eng. Chem.* 1933, 25, 11, 1280-1282, Malinowski et al. *Polish Journal of Chemical Technology* 9, no. 4 (2007): 111-114). However, for UCS adducts, difficulties still exist to achieve conversion to UCS and concurrently granulate. For example, the presence of a high percentage of moisture in slurries used to produce UCS reduces the UCS adduct formation. However when less than about 20% moisture is available in the slurry, the slurry can become difficult or impractical to pump. Thus, production of products with a high percentage of UCS and directly granulating can be impractical.

SUMMARY OF THE INVENTION

A discovery has been made that addresses at least some of the problems associated with calcium sulfate urea (UCS) adduct based fertilizers. In one aspect, a multi-step process (e.g., at least two steps) has been discovered that allows for facile production of a fertilizer containing a UCS adduct ($4NH_2CONH_2 \cdot CaSO_4$). The process can include a first step for conversion of urea and calcium sulfate to a UCS adduct. A second step can include granulation of the UCS adduct to form fertilizer granules. The first step for conversion to a UCS adduct can optionally include a storage period where UCS adduct conversion can continue to occur before granulation. This process can be used to produce a stable and high quality product while avoiding at least some of the aforementioned difficulties of the processes currently used in producing similar fertilizers. In the process of the invention, a solid liquid separation step is not needed, and water can be used in excess during the conversion to avoid dust formation and to ensure urea is in solution and available to convert with the calcium sulfate reactant. Steam can also be added to promote conversion by increasing the heat of the reactants. The UCS fertilizer granule product produced after drying the produced UCS adduct can be used as a high nitrogen content fertilizer. The fertilizer compositions can be beneficial where higher concentrations of nitrogen are desired.

In one aspect of the invention, UCS fertilizer granules are described. The UCS fertilizer granule can be any UCS adduct containing granule produced by the methods disclosed herein. The UCS fertilizer granule can include a urea-calcium sulfate (UCS) adduct. The UCS adduct can be $CaSO_4 \cdot 4CO(NH_2)_2$. In some instances, the granule contains over 55 wt. %, over 60 wt. %, over 65 wt. %, over 70 wt. %, over 75 wt. %, over 80 wt. %, or over 85 wt. % UCS adduct. The granule can contain less than 0.6 wt. % water, less than 0.5 wt. %, less than 0.4 wt. %, less than 0.3 wt. %, less than 0.2 wt. %, less than 0.1 wt. % water, or any amount or range thereof or there between.

In some instances, the granule can have a density greater than water (e.g., greater than 1.0 g/mL). The UCS fertilizer granule can be comprised of one or more particles. Also, the UCS fertilizer granules of the present invention can have an average particle size of 1 millimeter (mm) to 5 mm, preferable about 2 mm to 4 mm.

The UCS fertilizer granules of the present invention can also contain one or more additives. The additive can be a fertilizer, a micronutrient, a secondary nutrient, or an organic agent. The additive can be a fertilizer, compound, or composition that provides a nitrogen based fertilizer, a phosphate-based fertilizer, a potassium-based fertilizer, a urea-based fertilizer, a fertilizer providing nitrogen-phosphorus-potassium (NPK), diammonium phosphate (DAP), monoammonium phosphate (MAP), single superphosphate (SSP), triple superphosphate (TSP), urea, potassium chloride, potassium sulfate, magnesium sulfate, superphosphates, rock phosphate, potash, sulfate of potash (SOP), muriate of potash (MOP), kieserite, carnallite, magnesite, dolomite, boric acid, boron (B), copper (Cu), iron (Fe), manganese (Mn), molybdenum (Mo), zinc (Zn), selenium (Se), silicon (Si), free calcium (Ca), magnesium (Mg), elemental sulfur (S), neem oil, seaweed extract, bio-stimulants, char, ashes from incineration of animal waste or animal tissues, or any combination thereof.

The UCS fertilizer granule can include a coating on the surface of the granule. In some instances, the coating can include nutrients for a plant, inhibitors of urea hydrolysis and/or nitrification, agents to slow or increase the rate of degradation of the granule, agents to repel moisture and/or provide a hydrophobic layer, agents that decrease or increase the reactivity of the granule, agents that provide additional benefits to plants, agents that increase the stability and/or crush strength of the granule, pH buffering agents, drying agents, etc. or any combination thereof. The coating can be a commercially available coating, an oil, a fertilizer, a micronutrient, talc, a seaweed and/or seaweed extract, a wax, etc. In some instances, the coating can contain surfactants. In some instances, the coating contains a wax, surfactants, and/or an amine-based compound.

In yet another aspect of the invention, processes to produce the UCS fertilizer granules containing UCS adduct are described. The process can include (a) combining urea, calcium sulfate, and water under conditions sufficient to form an aqueous slurry containing a UCS adduct and (b) removing at least a portion of water from the aqueous slurry to form a partially dried material containing the UCS adduct. In one aspect, the partially dried material containing the UCS adduct can be used as a fertilizer. In one aspect, the partially dried material containing the UCS adduct can be stored and then used as a fertilizer or further processed to produce granules, which can then be used as a fertilizer. The storing step can include not heating or mixing the partially dried material containing the UCS adduct. Storing can include storage for 1 minute to several months, or any range or time therein. In some aspects, once the partially dried material containing the UCS adduct is produced it, or the stored UCS adduct, can be further processed via a granulation step to produce a UCS fertilizer granular. The granulation step can include (c) feeding the partially dried material into a granulator to form the UCS fertilizer granule. In some instances, (a) is performed in a vessel different than the granulator used in (c). In some instances, (a) is performed in the same granulation vessel used in (c) when the partially dried material is stored before being fed into the granulator to form the UCS fertilizer granule. In some non-limiting instances, the equipment and methods used in the Examples can be used.

The amount of water added in (a) can be an amount to provide more water than is minimally necessary to solubilize the urea. In some instances, the water content of the aqueous solution is 10 wt. %, 11 wt. %, 12 wt. %, 13 wt. %, 14 wt. %, 15 wt. %, 16 wt. %, 17 wt. %, 18 wt. %, 19 wt. %, 20 wt. %, or greater. The ratio of urea to calcium sulfate fed into (a) can be 1:2 to 3:1. In some instances the ratio is 1.2:1 to 2.7:1, 1.3:1 to 2.6:1, 1.35:1 to 2.6, or any range or ratio therein. The temperature of the reactants in (a) can be raised to 55° C., 60° C., 65° C., 70° C., 75° C., 80° C., 85° C., 90° C., 95° C., 100° C. or greater, or any temperature or range thereof or there between. In some instances, the reactants and/or vessel containing the reactants is heated by steam.

A portion of the water can be removed in (b) by partially drying the aqueous slurry in the same vessel used for (a) or a different vessel. The vessel used to partially dry the aqueous slurry and produce the partially dried material can be a dryer. In some instances, partial drying of the aqueous slurry occurs by contacting the aqueous slurry or vessel used for partially drying the aqueous slurry with steam. The aqueous slurry can be dried at 35° C., 40° C., 45° C., 50° C., 55° C., 60° C., 65° C., 70° C., 75° C., 80° C., 85° C., 90° C., 95° C., 100° C. or greater, or any temperature or range thereof or there between. The amount of water in the partially dried material produced in (b) can be 11 wt. %, 10 wt. %, 9 wt. %, 8 wt. %, 7 wt. %, 6 wt. %, 5 wt. %, 4 wt. %, 3 wt. %, 2 wt. %, 1 wt. %, 0.8 wt. %, 0.6 wt. %, or any number or range thereof or there between. The amount of UCS adduct in the partially dried material can be over 40 wt. %, over 45 wt. %, over 50 wt. %, over 55 wt. %, over 60 wt. %, over 65 wt. %, over 70 wt. %, over 75 wt. %, over 80 wt. %, or over 85 wt. %, or any amount or range thereof or there between.

The partially dried material can optionally be stored (e.g., not heated or mixed for a period of time) before (c). The storage can occur in the same vessel used to produce the aqueous slurry, produce the partially dried material, and/or in the granulator. The storage can occur in a different vessel than that used to produce the aqueous slurry, produce the partially dried material, and/or can be different than the granulator. The partially dried material can be stored for any amount of time, such as 1 minute, 10 minutes, 30 minutes, 1 hour, 2 hours, 4 hours, 8 hours, 12 hours, 16 hours, 1 day, 2 days, 5 days, 1 week, 2 weeks, 3 weeks, 4 weeks, 1 month, 2 months, 3 months, 4 months, or more, or any amount of time or range thereof or there between. During the optional storage, the partially dried material can cool. In some instances, the partially dried material can cool during storage to ambient temperature, room temperature, −20° C., −10° C., 0° C., 10° C., 20° C., 25° C., 30° C., 35° C., 40° C., 45° C., 50° C., 55° C., 60° C., or any temperature or range thereof or there between. During the optional storage, UCS adduct formation can continue to occur in the partially dried material. In some instances, the partially dried material is stored for about 2 weeks before granulation. In some instances, the partially dried material is stored for 2 weeks or less before granulation. In some instances, the partially dried material is stored for at least 1 day before granulation. In some instances, the partially dried material is stored for 1 day to 2 weeks before granulation.

The granulator used in step (c) can be a granulation drum, pugmill, pan granulator, etc. The granulator used to produce the UCS fertilizer granule can include a dryer or a dryer can be used after granulation. In some instances, drying of partially dried material or granulated partially dried material occurs by contacting the partially dried material or vessel used for drying the partially dried material with steam. The partially dried material or granulated partially dried material can be dried at 35° C., 40° C., 45° C., 50° C., 55° C., 60° C., 65° C., 70° C., 75° C., 80° C., 85° C., 90° C., 95° C., 100° C. or greater, or any temperature or range thereof or there between. The amount of water in the UCS fertilizer granule produced in (c) can be less than 0.6 wt. %, 0.5 wt. %, 0.4 wt. %, 0.3 wt. %, 0.2 wt. %, 0.1 wt. %, or less, or any amount or range thereof or there between. The amount of UCS adduct in the UCS fertilizer granule can be 40 wt. %, over 40 wt. %, over 45 wt. %, over 50 wt. %, over 55 wt. %, over 60 wt. %, over 65 wt. %, over 70 wt. %, over 75 wt. %, over 80 wt. %, over 85 wt. %, or any amount or range thereof or there between. In certain aspects, during granulation of the partially dried material, ammonia and sulfuric acid can be added to the granulator used in step (c). The ammonia and sulfuric acid can form ammonium sulfate and generate heat in the granulator, and can aid the granulation of the partially dried material and promote hardness of the UCS fertilizer granule being formed. In some aspects, the sulfuric acid can be a 70 wt. % to 98 wt. % sulfuric acid solution. The ammonia and sulfuric acid can be added in amounts such that weight of the ammonium sulfate formed can be 1 to 5 wt. % of the weight of the partially dried material being granulated, e.g., 1 to 5 g ammonium sulfate formed per 100 g of the partially dried material. In certain aspects, additional granulation aids can be added to the granulator during granulation of the partially dried material to promote granulation, enhance hardness of the UCS fertilizer granule being formed and lower dust formation during the granulation process. The granulation aid can be any suitable granulation aid including but not limited to surfactants.

In some aspects, the optional storage of the partially dried material might result in lumps formation in the partially dried material. In some aspects, the lumps can be broken up such as by crushing, prior to granulating the partially dried material. The broken up partially dried material can be granulated to produce the UCS fertilizer granule. In some particular aspects, the lumps can be broken up to a size below 2 mm prior to granulation. The lumps can be broken up by any suitable method known in the art, including but not limited to mechanical shovel feeding of the material into a lump crusher.

Forming the UCS fertilizer granule in the granulator can include adding additional urea, additional calcium sulfate, additional UCS adduct, additional water, and aqueous solution, and/or one or more additives into or coating the granule. In some instances, the additional water can be added in the form of steam. The aqueous solution can in some instances be a scrubber solution. The scrubber solution can be acidic, contain ammonia, and/or contain a source of nitrogen, phosphorous, and/or potassium. In some instances, the scrubber solution is scrubber solution for scrubbing or that has already been used for scrubbing dryer air and/or reducing dust particles from production of a fertilizer, such as the UCS fertilizer granule, and/or a nitrogen (N), phosphorous (P), and/or potassium (K) (e.g., NP, NK, or NPK) fertilizer. The additive can be a fertilizer, a micronutrient, a secondary nutrient, or an organic agent. The additive can be a fertilizer, compound, or composition that provides a nitrogen based fertilizer, a phosphate-based fertilizer, a potassium-based fertilizer, a urea-based fertilizer, a fertilizer providing nitrogen-phosphorus-potassium (NPK), diammonium phosphate (DAP), monoammonium phosphate (MAP), single superphosphate (SSP), triple superphosphate (TSP), urea, potassium chloride, potassium sulfate, magnesium sulfate, superphosphates, rock phosphate, potash, sulfate of potash (SOP), muriate of potash (MOP), kieserite, carnallite, magnesite, dolomite, boric acid, boron (B), copper (Cu), iron (Fe), manganese (Mn), molybdenum (Mo), zinc (Zn), selenium (Se), silicon (Si), free Ca, magnesium (Mg), elemental sulfur (S), neem oil, seaweed extract, bio-stimulants, char, ashes from incineration of animal waste or animal tissues, or any combination thereof.

The process of forming the UCS fertilizer granule can, in some aspects, include adding a coating on the surface of the UCS fertilizer granule. In some instances, the coating can contain nutrients for a plant, inhibitors of urea hydrolysis and/or nitrification, agents to slow or increase the rate of degradation of the granule, agents to repel moisture and/or provide a hydrophobic layer, agents that decrease or increase the reactivity of the granule, agents that provide additional benefits to plants, agents that increase the stability and/or crush strength of the granule, pH buffering agents, drying agents, etc. or any combination thereof. Non-limiting examples of a coating include a commercially available coating, an oil, a fertilizer, a micronutrient, talc, a seaweed and/or seaweed extract, a wax, etc. In some instances, the coating can contain surfactants. In some instances, the coating contains a wax, surfactants, and/or an amine-based compound. The coating can be applied to the granule before drying, during drying of the granule, or after drying of the granule. The coating can be applied to the granule by spraying, pouring, mixing, blending, etc. A fluid bed sprayer or coater, a liquid spray mixer, a rotating drum or pan, spray coating at discharge point, a paddle mixer, etc. can be used.

In certain aspects, the UCS fertilizer granules can be cooled prior to coating the granules, such as to around ambient temperature (e.g. ambient temperature−5° C. to ambient temperature+5° C.). A suitable cooler known in the art can be used to cool the UCS fertilizer granules, such as a fluid bed cooler or a rotary drum cooler. In some aspects, the UCS fertilizer granules can be cooled with air. In some aspects, the air used for the cooling can be processed, such as dehumidified, before entering the cooler. The air can be dehumidified to avoid moisture pick up by the UCS fertilizer granules being cooled. In some aspects, air used in the cooler can be conditioned to a relative humidity below the Critical Relative Humidity (CRH) of the UCS product, such as 60-65% for UCS comprising 27 wt. % nitrogen and 55-60% for UCS comprising 33 wt. % nitrogen.

In another aspect of the present invention, methods of fertilizing are described. A method can include applying a plurality of UCS fertilizer granules of the present invention to a portion of a soil, a crop, or a combination of the soil and the crop. In some embodiments, the soil is at least partially or fully submerged under water (e.g., rice paddy crops) and the granules sink in the water to contact the soil.

Also disclosed in the context of the present invention are blended or compounded fertilizer compositions that include a plurality of UCS fertilizer granules of the present invention mixed with other fertilizers, micronutrients, secondary nutrients, or organic agents. The fertilizers can be particulate in form (e.g., urea, monoammonium phosphate (MAP), diammonium phosphate (DAP), muriate of potash (MOP), and/or sulfate of potash (SOP)). Preferably, the UCS granules and additional fertilizers are compatible with each other (e.g., can contact each other without having a chemical reaction take place). The blended or compounded fertilizer can contain in addition to the UCS fertilizer granules, a nitrogen based fertilizer, a phosphate-based fertilizer, a potassium-based fertilizer, a urea-based fertilizer, a fertilizer providing nitrogen, phosphorus, and potassium (NPK), diammonium phosphate (DAP), monoammonium phosphate (MAP), single superphosphate (SSP), triple superphosphate (TSP), urea, potassium chloride, potassium sulfate, magnesium sulfate, superphosphates, rock phosphate, potash, sulfate of potash (SOP), muriate of potash (MOP), kieserite, carnallite, magnesite, dolomite, boric acid, B, Cu, Fe, Mn, Mo, Zn, Se, Si, Ca, Mg, S, neem oil, seaweed extract, bio-stimulants, char, ashes from incineration of animal waste or animal tissues, etc., or any combination thereof.

The following includes definitions of various terms and phrases used throughout this specification.

The term "fertilizer" is defined as a material applied to soils or to plant tissues to supply one or more plant nutrients essential or beneficial to the growth of plants and/or stimulants or enhancers to increase or enhance plant growth.

Non-limiting examples of fertilizers include materials having one or more of urea, ammonium nitrate, calcium ammonium nitrate, urea calcium sulfate adduct, one or more superphosphates, binary NP fertilizers, binary NK fertilizers, binary PK fertilizers, NPK fertilizers, molybdenum, zinc, copper, boron, cobalt, and/or iron. In some aspects, fertilizers include agents that enhance plant growth and/or enhance the ability for a plant to receive the benefit of a fertilizer, such as, but not limited to biostimulants, urease inhibitors, and nitrification inhibitors.

The term "micronutrient" is defined as a chemical element or substance used in trace amounts for the normal growth and development of a plant. Non-limiting examples of micronutrients include B, Cu, Fe, Mn, Mo, Zn, Se, and Si or compounds thereof.

The term "secondary nutrient" is defined as a chemical element or substance used in moderate amounts for plant growth and are less likely to limit crop growth in comparison to N, P, and K. Non-limiting examples of secondary nutrients include Ca, Mg, and S.

The term "organic agent" is defined as a substance that is produced by or part of an organism. Non-limiting examples of organic agents suitable for a fertilizer include neem oil, seaweed extract, bio-stimulants, char, ashes from incineration of animal waste or animal tissues, and diatomaceous earth.

The term "granule" can include a solid material. A granule can have a variety of different shapes, non-limiting examples of which include a spherical, a puck, an oval, a rod, an oblong, or a random shape.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The UCS fertilizer granules and methods of producing the UCS fertilizer granules of the present invention can "comprise," "consist essentially of," or "consist of" particular ingredients, components, compositions, steps, etc. disclosed throughout the specification. With respect to the transitional phase "consisting essentially of," in one non-limiting aspect, a basic and novel characteristic of the UCS fertilizer granules of the present invention is the presence of a urea-calcium sulfate (UCS) adduct in the UCS granule. Further, the process for producing the UCS fertilizer granules can in some instances include a multi-step process that can include forming a UCS adduct and removing a portion of water from the reaction/product material to form a partially dried material and then granulating the partially dried material to form a UCS fertilizer granule.

In the context of the present invention, at least the following 23 aspects are provided. Aspect 1 is directed to a method of making a calcium sulfate urea (UCS) fertilizer granule, the method comprising: (a) combining urea, calcium sulfate, and water under conditions sufficient to form an aqueous slurry comprising a UCS adduct; (b) removing at least a portion of water from the aqueous slurry to form a partially dried material comprising the UCS adduct and optionally storing the partially dried material; and (c) feeding the partially dried material into a granulator to form the UCS fertilizer granule. Aspect 2 is directed to the method of aspect 1, wherein step (a) is performed in a vessel different than the granulator from step (c). Aspect 3 is directed to the method of any one of aspects 1 to 2, wherein the partially dried material comprises 10 wt. % to 0.6 wt. % water. Aspect 4 is directed to the method of any one of aspects 1 to 3, wherein the UCS fertilizer granule formed comprises 0.5 wt. % water or less. Aspect 5 is directed to the method of any one of aspects 1 to 4, wherein step (b) comprises feeding the aqueous slurry from step (a) into a dryer to form the partially dried material. Aspect 6 is directed to the method of any one of aspects 1 to 5, wherein the aqueous slurry formed comprises greater than 10 wt. % to 25 wt. % water. Aspect 7 is directed to the method of any one of aspects 1 to 6, wherein step (b) comprises contacting the aqueous slurry with steam to heat the aqueous slurry. Aspect 8 is directed to the method of any one of aspects 1 to 7, wherein step (c) comprises contacting the partially dried material with steam to heat the partially dried material. Aspect 9 is directed to the method of any one of aspects 1 to 8, wherein forming the UCS fertilizer granule in the granulator further comprises combining the partially dried material with additional urea, calcium sulfate, and/or additional UCS adduct. Aspect 10 is directed to the method of any one of aspects 1 to 9, wherein forming the UCS fertilizer granule in the granulator further comprises contacting the partially dried material with a scrubber solution. Aspect 11 is directed to the method of any one of aspects 1 to 10, wherein the method further comprises coating at least a portion of the UCS fertilizer granule. Aspect 12 is directed to the method of aspect 11, wherein the UCS fertilizer granule is coated with a plant based and/or animal based oil. Aspect 13 is directed to the method of aspect 11 or 12, comprising cooling the UCS fertilizer granule with air prior to coating the UCS fertilizer granule. Aspect 14 is directed to the method of any one of aspects 1 to 13, wherein step (b) comprises storing the partially dried material for 1 day to 2 weeks before feeding the partially dried material into a granulator. Aspect 15 is directed to the method of any one of aspects 1 to 14, wherein a weight ratio of urea to calcium sulfate combined in step (a) is 1:1 to 3:1. Aspect 16 is directed to the method of any one of aspects 1 to 15, wherein the UCS fertilizer granule formed contains 40 wt. % to 90 wt. % UCS adduct. Aspect 17 is directed to the method of aspect 16, wherein the UCS fertilizer granule formed contains 60 wt. % to 90 wt. % UCS adduct. Aspect 18 is directed to the method of any one of aspects 1 to 17, further comprising combining the UCS fertilizer granule with at least one additional fertilizer to form a fertilizer blend and/or compounded fertilizer. Aspect 19 is directed to the method of any one of aspects 1 to 18, comprising storing the partially dried material, prior to step (c), and crushing at least a portion of lumps formed in the partially dried material. Aspect 20 is directed to the method of any one of aspects 1 to 19, comprising feeding ammonia and sulfuric acid to the granulator during step (c) to form ammonium sulfate and to provide heat to the partially dried material. Aspect 21 is directed to a calcium sulfate urea (UCS) fertilizer granule formed by the method of any one of aspects 1 to 20. Aspect 22 is directed to the fertilizer granule of aspect 21, comprised in a fertilizer blend or a compounded fertilizer. Aspect 23 is directed to a method of fertilizing, the method comprising applying the UCS fertilizer granule, the fertilizer blend comprising the UCS fertilizer granule, or the compounded fertilizer comprising the UCS fertilizer granule of any one of aspects 21 to 22, or any combination thereof, to a portion of a soil, a crop, or the soil and the crop.

BRIEF DESCRIPTION OF THE DRAWINGS

Advantages of the present invention may become apparent to those skilled in the art with the benefit of the following detailed description and upon reference to the accompanying drawings.

While the invention is susceptible to various modifications and alternative forms, specific embodiments thereof are shown by way of example in the drawings. The drawings may not be to scale.

DETAILED DESCRIPTION OF THE INVENTION

A fertilizer containing a UCS adduct and a process for producing a UCS fertilizer granule are disclosed. The UCS fertilizer granule can be produced in a multi-step process (e.g., two-steps). A first step can include conversion of urea and calcium sulfate to a UCS adduct. A second step can include granulation of the UCS adduct to form fertilizer granules. The first step for conversion to a UCS adduct can optionally include a storage period where UCS adduct conversion can continue to occur before granulation. This multi-step process can produce a stable and high quality product while avoiding the difficulties in achieving and maintaining the proper conditions needed for a single-step conversion/granulation process.

The UCS fertilizer granule of the present invention can be produced by the following non-limiting reaction:

These and other non-limiting aspects of the present invention are discussed in further detail in the following sections.

A. Process to Produce UCS Fertilizer Granules

Figure 1A:
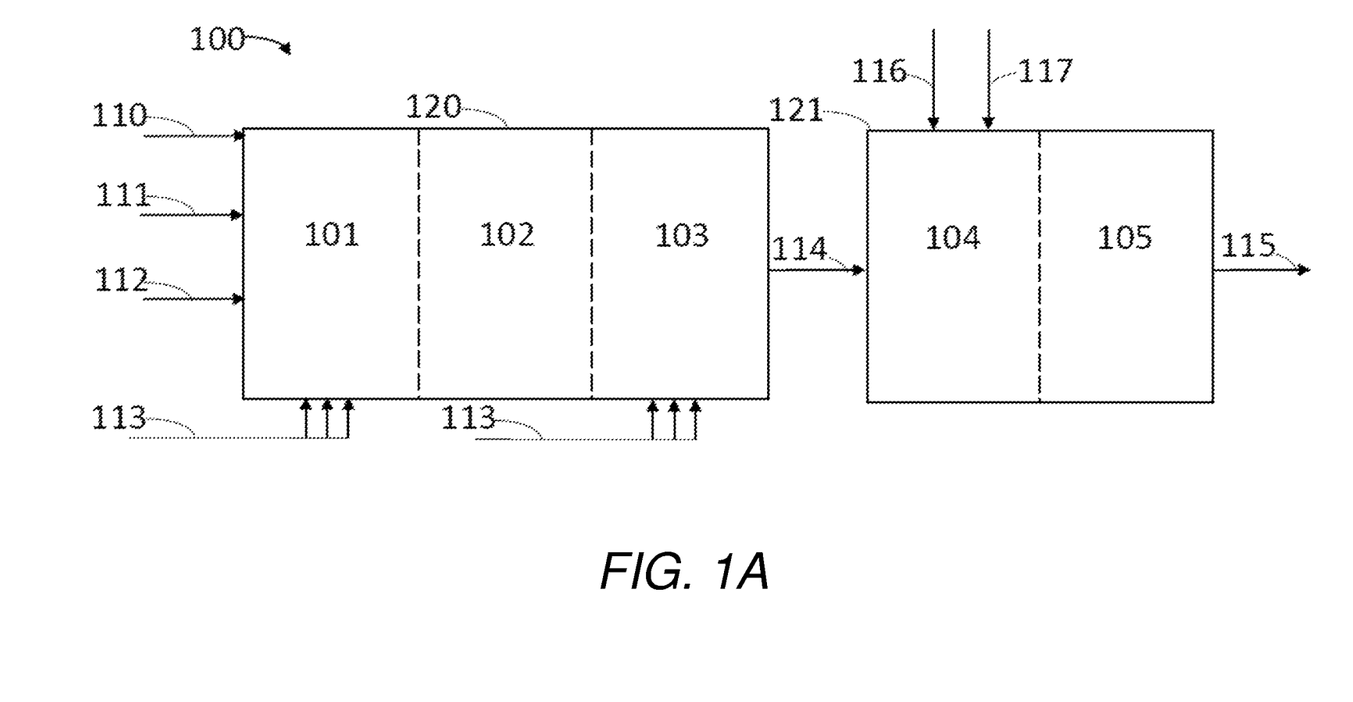
FIGS. 1A-1C are: 1A a non-limiting schematic of a system that can be used to produce UCS fertilizer granules of the present invention in which urea, calcium sulfate, and water can be used as starting materials; 1B a non-limiting schematic of a system that can be used where an optional storage step is included before granulating; 1C a non-limiting schematic of a system that can be used where an optional coating can be added to the granule; 1D a non-limiting schematic of a system that can be used where an optional storage step and a lump crusher is included before granulating; and 1E a non-limiting schematic of a system that can be used where an optional cooling unit and granule coater can be added after granulation.
Figure 1B:
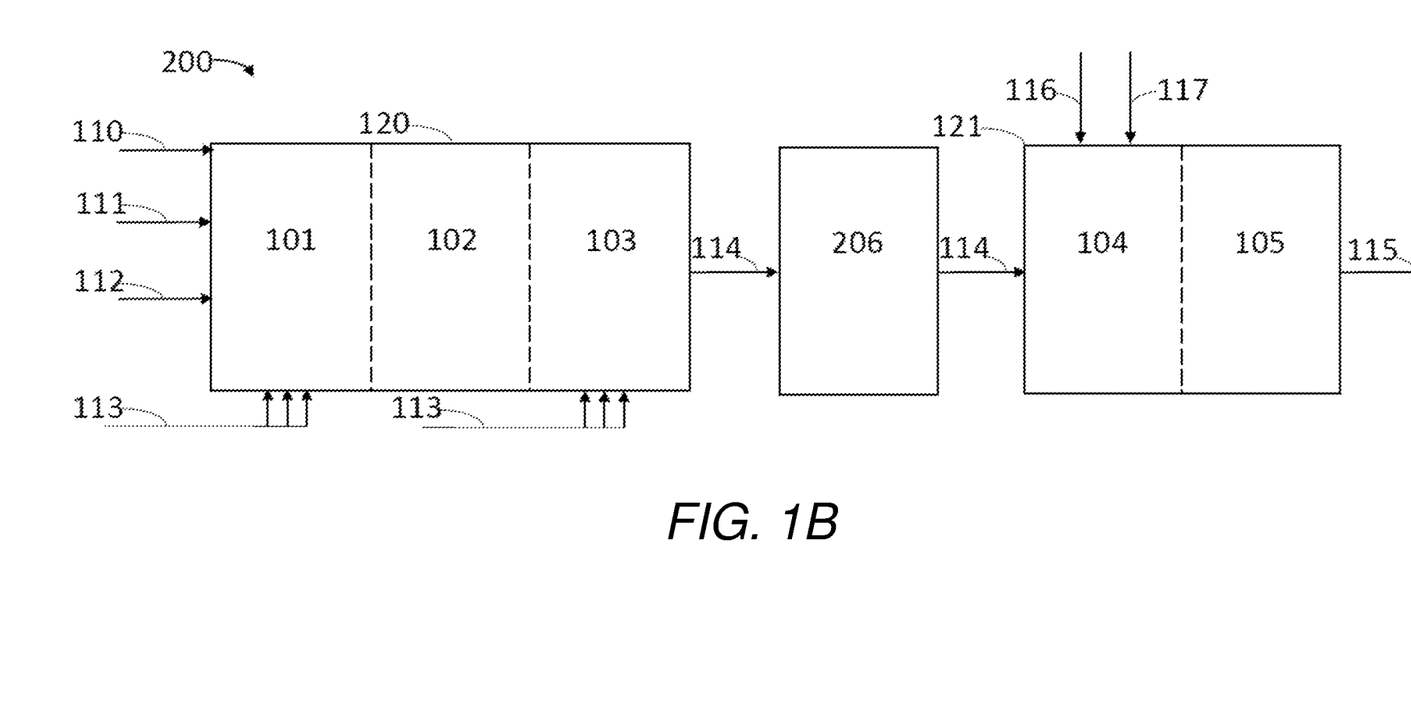
Figure 1C:
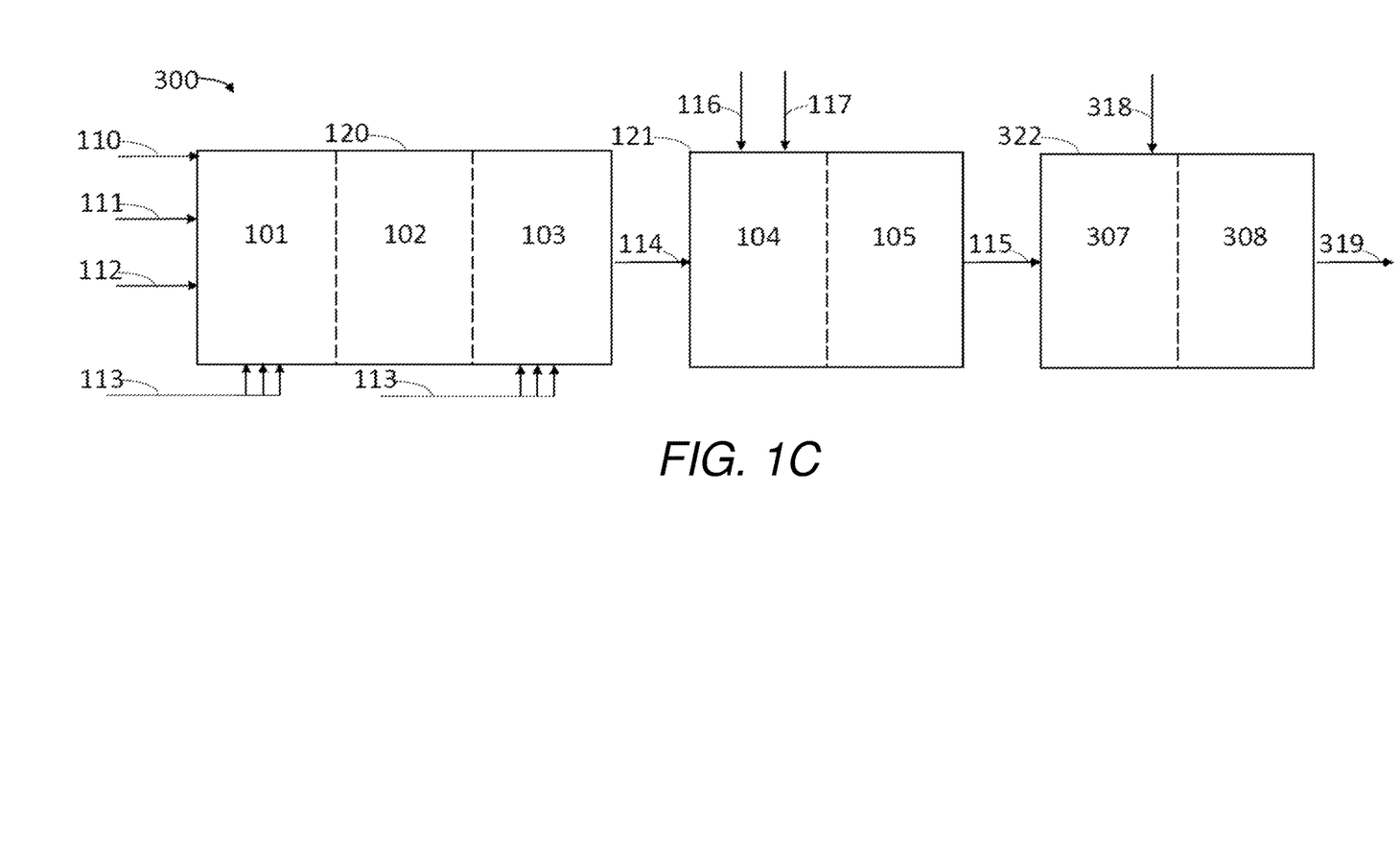

The UCS granules of the present invention can be made using a granulation system such as, but not limited to, granulation systems 100, 200, and/or 300 shown in FIG. 1A, FIG. 1B, or FIG. 1C, respectively, or a combination thereof. The granulation systems can be continuous processes or batch processes capable of handling slurries. The granulation systems can include a mixing zone 101 that is or is within a first vessel 120. The mixing zone 101 can be in a continuous stirred-tank reactor. In the mixing zone 101, urea 110 (e.g., fresh urea prills, urea melt, or a urea solution), water 111, and calcium sulfate 112 (in any hydrated or non-hydrated state, e.g, gypsum, anhydrous gypsum, calcium sulfate hemihydrate, and calcium sulfate dihydrate) can be combined in the mixing zone 101 (e.g., a continuous stirred-tank reactor) to form an aqueous slurry. In some instances, the water content of the aqueous slurry is 10% to 50% by weight, 10% to 25% by weight, 12% to 25% by weight, 12% to 20% by weight, 12 to 16% by weight, or 14% to 20% by weight, or any range therein. Mixing (e.g., agitator rpm of between 40 to 60 RPM) can be used to promote formation of the UCS adduct and/or to decrease the amount of heat required for the formation. First vessel 120 may include a rotatable section, a rotatable internal container, and/or a section that vibrates. In some instances, the rotatable section and/or rotatable internal container may contain internal flights and/or be rotated to induce movement of the reactants (urea 110 and calcium sulfate 112). Optionally, the calcium sulfate can be converted in the mixing zone 101 or before being added to the mixing zone 101 to calcium sulfate dihydrate (gypsum) suitable for the UCS granule formation.

Urea dissolution is an endothermic process. Optionally, the temperature of the mixing zone 101 can be increased to 1) increase the formation of the adduct, 2) decrease the amount of water 111 needed, and/or 3) decrease the viscosity of the aqueous slurry. Heat can be provided by any means suitable or known. In some instances, steam 113 is used. The optional use of steam can inhibit absorption of heat from the surroundings and hence lower the temperature requirement in the mixing zone 101 without additional energy. With steam injection, the urea can be rapidly dissolved while the surrounding material is maintained at the high temperature, which can preferably be about 60° C. to 100° C. or any range or value therein.

Without wishing to be bound by theory, it is believed that the urea can be in solution (partially or fully solubilized) to exchange urea for water in the calcium sulfate so as to form the UCS adduct. Excess water can be used in the mixing zone to increase the rate and/or amount of UCS adduct formed. Additional active or inactive ingredients can be added to the aqueous slurry while in the mixing zone 101 or at any other time.

Alternatively, urea can be dissolved in an aqueous solution, calcium sulfate 112 can be formed into a slurry, or any combination thereof can be performed before entry into the mixing zone 101 in a premixing zone (not shown) or can be premixed in the mixing zone 101 before or during the addition of any one or more of the other ingredients. All or part of the water 111 that enters the mixing zone 101 can enter in a urea 110 solution, calcium sulfate 112 slurry, steam 113, and/or in combination with any of the other ingredients.

Also as an alternative, the aqueous slurry containing UCS adduct produced in the mixing zone 101 can exit the mixing zone 101 and enter a second mixing zone (not shown) where additional reactants, active ingredients, or inactive ingredients can be added to the aqueous slurry.

Though shown in the figures, optionally, the slurry can exit the mixing zone 101 and enter a stabilizing zone 102 where mixing and/or reacting of the ingredients can be continued and/or UCS recycle 116, urea 110, calcium sulfate 112, or an additive can be added (not shown). In some embodiments, UCS recycle 116, urea 110, calcium sulfate 112, or an additive can be added to any one of the zones to help maintain consistency of the mixture, or provide beneficial properties to the UCS fertilizer granule 115, slurry, or partially dried material 114.

The conditions of the material exiting or in the stabilizing zone 102, mixing zone 101, or second mixing zone can be a slurry, typically containing more than 10 wt. % water. In some instances, the slurry can tend to stick to the surfaces of the stabilizing zone 102, mixing zone 101, second mixing zone, or dryer or drying zone 103. Use of vibration or hammers can be used to remove the UCS from the surfaces.

Partially drying the slurry can create crystal bridges to enable crystallization of the UCS adduct and can make the UCS adduct containing material easier to transport, handle, and/or store. The slurry can be partially dried before granulation by entering a dryer or drying zone 103. In some instances, the dryer or drying zone 103 can be a part or function of the first vessel 120 or can be separate (not shown). The drying zone 103 can be a part of the mixing zone 101 and/or the stabilizing zone 102 (not shown). Heat for drying can be provided by any means suitable or known. In some embodiments, the drying zone 103 can be heated by steam 113 (not shown), such as in steam jacketed dryer. The slurry can be dried to form a partially dried material 114 having 10 wt. % to 0.6 wt. % water before exiting the dryer or drying zone 103 and/or the first vessel 120.

Optionally, the partially dried material 114 can be stored before granulation (FIG. 1B). During storage, in some instances, the partially dried material 114 is not continuously mixed or actively heated to temperatures above room temperature (e.g., the partially dried material 114 can sit in a container located in a storage facility). The partially dried material 114 can be stored in a storage zone 206. The storage zone can be part of the first vessel 120 (not shown) or can be separate from the first vessel 120. The storage 206 can be a part of the mixing zone 101, the stabilizing zone 102, and/or the dryer or drying zone 103 (not shown) while these zones are not mixing or actively heating the partially dried material 114.

Figure 1D:
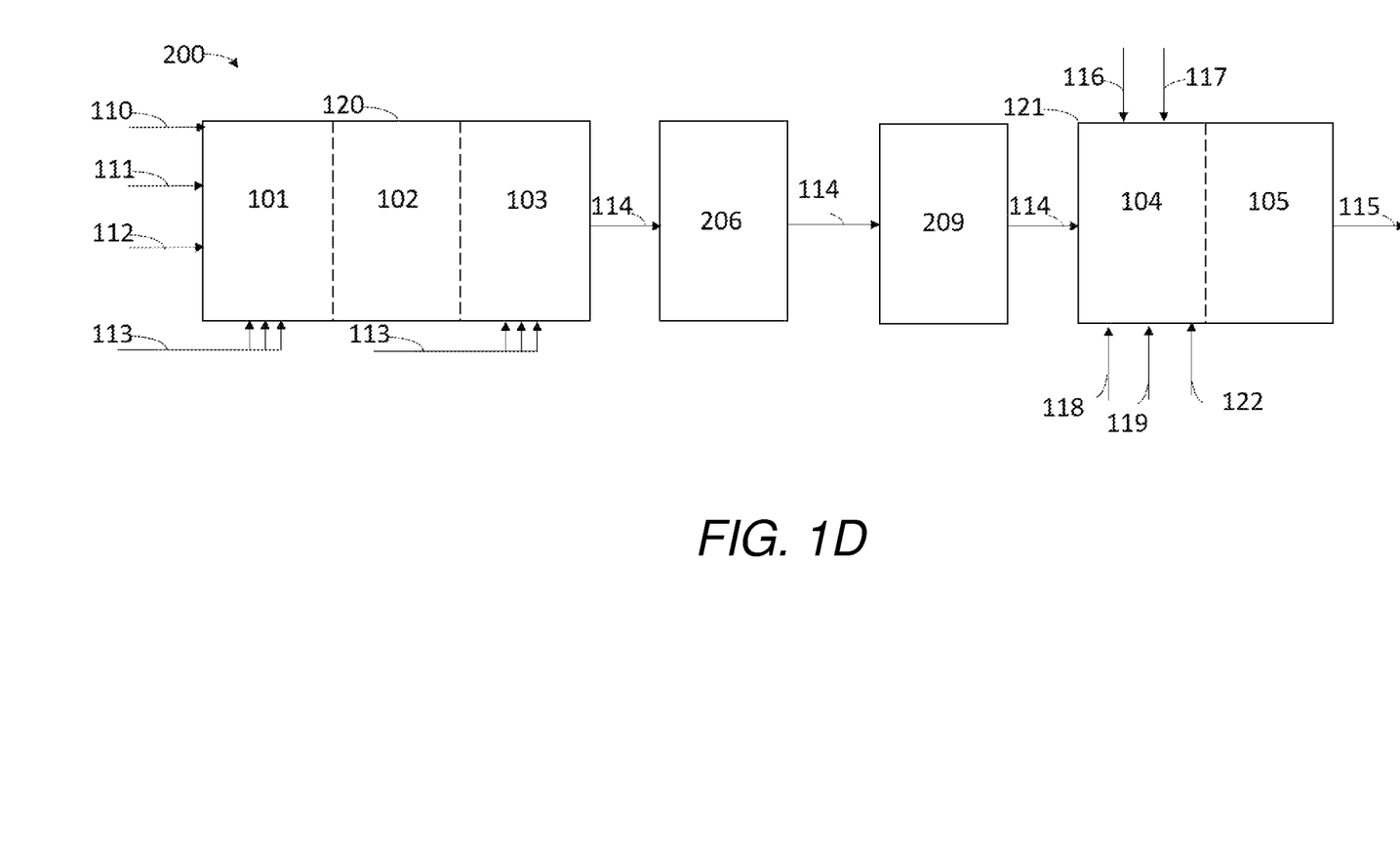

The partially dried material 114 after drying in the dryer or drying zone 103 or after storage can be granulated in a granulation zone 104 to form granules of partially dried material or granulated and further dried to form solid UCS fertilizer granules 115. The granulation zone 104 can be in the granulator 121 or, if the partially dried material is stored before granulation, in the first vessel 120. The granulation zone 104 can be separate from the first vessel 120. The granulation zone 104 can be a separate zone or container than the mixing zone 101, stabilizing zone 102, dryer or drying zone 103, and/or storage zone 206. In some instances, the storage zone 206, mixing zone 101, stabilizing zone 102, and/or the dryer or drying zone 103 can be part of the granulation zone 104 if the partially dried material 114 is stored before granulation. The granulation zone 104, may include a rotatable section, a rotatable internal container, and/or a section that vibrates. In some instances, the rotatable section and/or rotatable internal container may contain internal flights and/or be rotated to induce movement of the partially dried material 114. The granulation zone 104 can be or can be part of a granulation drum, pugmill, pan granulator, etc. In certain aspects, during granulation of the partially dried material 114, ammonia 118 and sulfuric acid 119 can be added to the granulation zone 104 (FIG. 1D). The ammonia 118 and sulfuric acid 119 can form ammonium sulfate and generate heat in the granulation zone 104, and can aid the granulation of the partially dried material 114 and promote hardness of the UCS fertilizer granules 115. In some aspects, the sulfuric acid 119 can be a 70 wt. % to 98 wt. % of sulfuric acid solution. The ammonia 118 and sulfuric acid 119 can be added in amounts such that weight of the ammonium sulfate formed can be 1 to 5 wt. % of the weight of the partially dried material 114, e.g., 1 to 5 g per 100 g of the partially dried material 114. In certain aspects, additional granulation aid(s) 122 can be added to the granulation zone 104 (FIG. 1D) during granulation of the partially dried material 114 to promote granulation, enhance hardness of the UCS fertilizer granules 115, and lower dust formation during the granulation process. In some aspects, the granulation aid 122 can be surfactants.

In some aspects, the optional storage of the partially dried material 114 in the storage zone 206 might result in lump formation in the partially dried material. In some aspects, the lumps can be broken up, such as by crushing, prior to granulating the partial dried material 114 and the broken up partial dried material can be granulated to produce the UCS fertilizer granules 115. In some particular aspects, lumps formed in the partially dried material 114 can be broken up to a size below 2 mm prior to granulation. In certain aspects, the lumps can be broken up in a lump crusher 209 (FIG. 1D).

Optionally, water or an aqueous solution 117, such as steam and/or a scrubber solution, can be combined with the partially dried material 114 in the granulation zone 104 to facilitate granulation of the partially dried material 114. UCS recycle 116 (shown), urea 110, calcium sulfate 112, or an additive (not shown) can be added to the material in the granulation zone 104.

Further drying the partially dried material 114 or granulated partially dried material can enable agglomeration to form solid USC fertilizer granules 115. The further drying can occur in a further drying zone 105 that can be a dryer and/or part of or a function of the granulator 121 or the first vessel 120. In some embodiments, the partially dried material 114 is granulated and further dried at the same time, such as in a rotating dryer. The further drying zone 105 can be a separate zone or container than the mixing zone 101, stabilizing zone 102, dryer or drying zone 103, storage zone 206, and/or granulating zone 104. The further drying zone 105 can be part of the mixing zone 101, stabilizing zone 102, dryer or drying zone 103, storage zone 206, and/or granulation zone 104. In some embodiments, the further drying zone 105 can be heated by steam 113 (not shown), such as in steam jacketed granulator. The formation of the UCS fertilizer granules 115 can occur or continue during the further drying of the material. The operating temperature of the further drying zone 105 can also be used to adjust the temperature at which the UCS recycle 116 re-enters the granulation system. Continuous operation can be achieved with further drying zone exit temperatures (as measured by the exit gas) between 80° C. to 90° C., preferably 85° C. to 88° C. or any value or range therein. In some non-limiting instances, if the exit temperature rises above 90° C. to 95° C., the composition may melt creating a molten mass inside the further drying zone 105.

Optionally, the surface of the UCS fertilizer granules 115 can be coated to form a coated UCS fertilizer granule 319. Optional coating material 318 can be introduced into a coating zone 307 (FIG. 1C). The coating zone may be in a granule coater 322. The coating zone 307 can be a separate zone or container than the mixing zone 101, stabilizing zone 102, dryer or drying zone 103, storage zone 206, granulating zone 104, and/or further drying zone 105. The coating zone 307 can be part of the mixing zone 101, stabilizing zone 102, dryer or drying zone 103, storage zone 206, granulation zone 104, and/or further drying zone 105. In some embodiments, the coating material 318 can be distributed onto the UCS fertilizer granules 115 by sprayers.

The coating can optionally be dried on the UCS fertilizer granule 115 by heating the coated UCS fertilizer granule 319. The coating can be dried in a coating drying zone 308. The coating drying zone 308 can be part of the granule coater 322, granulator 121, or first vessel 120. The coating drying zone 308 can be a separate zone or container than the coating zone 307, mixing zone 101, stabilizing zone 102, dryer or drying zone 103, storage zone 206, granulating zone 104, and/or further drying zone 105. The coating drying zone 308 can be part of the coating zone 307, mixing zone 101, stabilizing zone 102, dryer or drying zone 103, storage zone 206, granulation zone 104, and/or further drying zone 105. In some embodiments, the coating drying zone 308 can be heated by steam 113 (not shown), such as in steam jacketed granule coater.

Figure 1E:
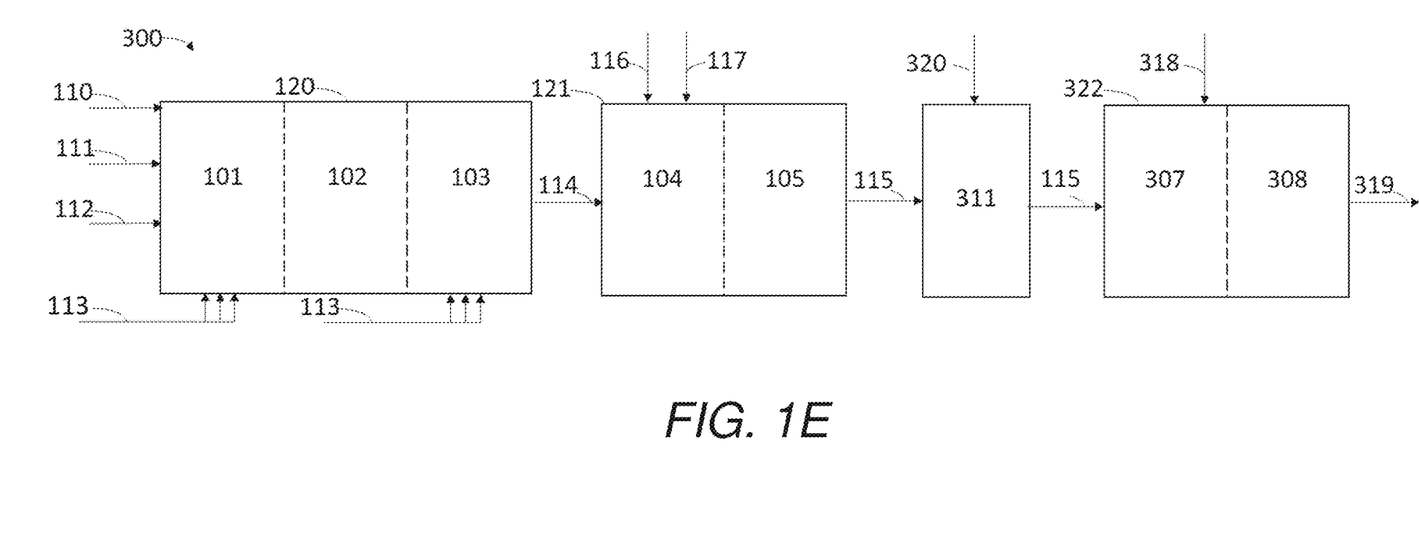

In certain aspects, the UCS fertilizer granules 115 can be cooled prior to coating the granules to form the coated UCS fertilizer granules 319. The fertilizer granules 115 from the zone 105 can be cooled in a cooling zone 311 by air 320, and the UCS fertilizer granules 115 after cooling can be coated in the granule coater 322 (FIG. 1E). In certain aspects, the UCS fertilizer granules in the cooling zone 311 can be cooled to around ambient temperature (e.g. ambient temperature−5° C. to ambient temperature+5° C.). In certain aspects, the cooling zone 311 can be a fluid bed cooler or a rotary drum cooler. In some aspects, the air 320 can be dehumidified air to avoid moisture pick up by the UCS fertilizer granules 115 being cooled in the cooling zone 311. In some aspects, the air 320 can be a conditioned air, conditioned to a relative humidity below the Critical Relative Humidity (CRH) of the UCS granules 115, such as 60-65% for UCS comprising 27 wt. % nitrogen and 55-60% for UCS comprising 33 wt. % nitrogen.

B. UCS Fertilizer Granules

The UCS fertilizer granule produced can, in some instances, contain low amounts of moisture. The free-moisture content of the granule can be less than 0.6 wt. %, less than 0.5 wt. % water or 0.25 wt. % to less than 0.6 wt. % water. In some instances, the free moisture content is 0.5, 0.4, 0.3, 0.2, 0.1, or 0 wt. %.

The granule can be comprised of one or more particles. A first portion of the particles can be the UCS adduct. In certain non-limiting aspects, the first portion of the particles can have an average particle size of 1, 2, 3, 4, 5, 6, 7, 8, 9, 10, 11, 12, 13, 14, 15, 20, 30, 40, 50, 60, 70, 80, 90, 100, 200, 300, 400, 500, 600, 700, 800, or 900 micrometers or any size there between. In some embodiments, the particles can be elongated particles or can be substantially spherical particles or other shapes, or combinations of such shapes. Non-limiting examples of shapes include a sphere, a puck, an oval, a rod, an oblong, or a random shape.

The UCS granules can have a crush strength of 1, 2, 3, 4, 5, 6, 7, 8, 9, 10 kgf/granule, or more, or any amount there between, preferably 2 kgf/granule to 5 kgf/granule.

The UCS granules can in some instances contain a coating on the surface of the UCS granule. In some instances, the coating can include nutrients for a plant, inhibitors of urea hydrolysis and/or nitrification, agents to slow or increase the rate of degradation of the granule, agents to repel moisture and/or provide a hydrophobic layer, agents that decrease or increase the reactivity of the granule, agents that provide additional benefits to plants, agents that increase the stability and/or crush strength of the granule, pH buffering agents, drying agents, etc. or any combination thereof. The coating can be a commercially available coating, an oil, a fertilizer, a micronutrient, talc, a seaweed and/or seaweed extract, a wax, etc. In some instances, the coating can contain surfactants. In some instances, the coating contains a wax, surfactants, and/or an amine-based compound.

C. Blended or Compounded Fertilizer Compositions

The UCS fertilizer granules of the present invention can also be included in a blended or compounded fertilizer composition comprising other fertilizers, such as other fertilizer granules. Additional fertilizers can be chosen based on the particular needs of certain types of soil, climate, or other growing conditions to maximize the efficacy of the UCS granules in enhancing plant growth and crop yield. The other fertilizer granules can be granules of urea, single super phosphate (SSP), triple super phosphate (TSP), ammonium sulfate, monoammonium phosphate (MAP), diammonium phosphate (DAP), muriate of potash (MOP), and/or sulfate of potash (SOP), and the like.

D. Method of Using the UCS Fertilizer Granules

The UCS fertilizer granules of the present invention can be used in methods of increasing the amount of nitrogen in soil and of enhancing plant growth. Such methods can include applying to the soil an effective amount of a composition comprising the UCS fertilizer granule of the present invention. The method may include increasing the growth and yield of crops, trees, ornamentals, etc. such as, for example, palm, coconut, rice, wheat, corn, barley, oats, and soybeans. The method can include applying UCS fertilizer granules of the present invention to at least one of a soil, an organism, a liquid carrier, a liquid solvent, etc.

Non-limiting examples of plants that can benefit from the fertilizer of the present invention include vines, trees, shrubs, stalked plants, ferns, etc. The plants may include orchard crops, vines, ornamental plants, food crops, timber, and harvested plants. The plants may include Gymnosperms, Angiosperms, and/or Pteridophytes. The Gymnosperms may include plants from the Araucariaceae, Cupressaceae, Pinaceae, Podocarpaceae, Sciadopitaceae, Taxaceae, Cycadaceae, and Ginkgoaceae families. The Angiosperms may include plants from the Aceraceae, Agavaceae, Anacardiaceae, Annonaceae, Apocynaceae, Aquifoliaceae, Araliaceae, Arecaceae, Asphodelaceae, Asteraceae, Berberidaceae, Betulaceae, Bignoniaceae, Bombacaceae, Boraginaceae, Burseraceae, Buxaceae, Canellaceae, Cannabaceae, Capparidaceae, Caprifoliaceae, Caricaceae, Casuarinaceae, Celastraceae, Cercidiphyllaceae, Chrysobalanaceae, Clusiaceae, Combretaceae, Cornaceae, Cyrillaceae, Davidsoniaceae, Ebenaceae, Elaeagnaceae, Ericaceae, Euphorbiaceae, Fabaceae, Fagaceae, Grossulariaceae, Hamamelidaceae, Hippocastanaceae, Illiciaceae, Juglandaceae, Lauraceae, Lecythidaceae, Lythraceae, Magnoliaceae, Malpighiaceae, Malvaceae, Melastomataceae, Meliaceae, Moraceae, Moringaceae, Muntingiaceae, Myoporaceae, Myricaceae, Myrsinaceae, Myrtaceae, Nothofagaceae, Nyctaginaceae, Nyssaceae, Olacaceae, Oleaceae, Oxalidaceae, Pandanaceae, Papaveraceae, Phyllanthaceae, Pittosporaceae, Platanaceae, Poaceae, Polygonaceae, Proteaceae, Punicaceae, Rhamnaceae, Rhizophoraceae, Rosaceae, Rubiaceae, Rutaceae, Salicaceae, Sapindaceae, Sapotaceae, Simaroubaceae, Solanaceae, Staphyleaceae, Sterculiaceae, Strelitziaceae, Styracaceae, Surianaceae, Symplocaceae, Tamaricaceae, Theaceae, Theophrastaceae, Thymelaeaceae, Tiliaceae, Ulmaceae, Verbenaceae, and/or Vitaceae family.

The effectiveness of compositions comprising the UCS fertilizer granules of the present invention can be ascertained by measuring the amount of nitrogen in the soil at various times after applying the fertilizer composition to the soil. It is understood that different soils have different characteristics, which can affect the stability of the nitrogen in the soil. The effectiveness of a fertilizer composition can also be directly compared to other fertilizer compositions by doing a side-by-side comparison in the same soil under the same conditions.

In one aspect, the UCS fertilizer granules of the present invention can have a density that is greater than water. This can allow the granules to sink in water rather than float. This can be especially beneficial in instances where application is intended to a crop that is at least partially or fully submerged in water. A non-limiting example of such a crop is rice, as the ground in a rice paddy is typically submerged in water. Thus, application of UCS granules to such crops can be performed such that the granules are homogenously distributed on the ground that is submerged under water. By comparison, granules that have a density that is less than water would have a tendency to remain in or on the water surface, which could result in washing away of the granules and/or coalescence of the granules, either of which would not achieve homogenous distribution of the granules to the ground that is submerged under water.

D. Compositions

The UCS granules can be used alone or in combination with other fertilizer actives and micronutrients. The other fertilizer actives and micronutrients can be added with any of the ingredients at the beginning of the granulation process or at any later stage.

Non-limiting examples of additional additives can be micronutrients, primary nutrients, and secondary nutrients. A micronutrient is a botanically acceptable form of an inorganic or organometallic compound such as boron, copper, iron, chloride, manganese, molybdenum, nickel, or zinc. A primary nutrient is a material that can deliver nitrogen, phosphorous, and/or potassium to a plant. Nitrogen-containing primary nutrients may include urea, ammonium nitrate, ammonium sulfate, diammonium phosphate, monoammonium phosphate, urea-formaldehyde, or combinations thereof. A secondary nutrient is a substance that can deliver calcium, magnesium, and/or sulfur to a plant. Secondary nutrients may include lime, gypsum, superphosphate, or a combination thereof. For example, in some instances the UCS granule can contain calcium sulfate, potassium sulfate, magnesium sulfate or a combination thereof.

In one aspect, the UCS granules can comprise one or more inhibitors. The inhibitor can be a urease inhibitor or a nitrification inhibitor, or a combination thereof. In one aspect, a UCS granule can comprise a urease inhibitor and a nitrification inhibitor. In one aspect, the inhibitor can be a urease inhibitor. Suitable urease inhibitors include, but are not limited to, N-(n-butyl) thiophosphoric triamide (NBTPT) and phenylphosphorodiamidate (PPDA). In one aspect, the UCS fertilizer granule can comprise NBTPT or PPDA, or a combination thereof. In another aspect, the inhibitor can be a nitrification inhibitor. Suitable nitrification inhibitors include, but are not limited to, 3,4-dimethylpyrazole phosphate (DMPP), dicyandiamide (DCD), thiourea (TU), 2-chloro-6-(trichloromethyl)-pyridine (Nitrapyrin), 5-ethoxy-3-trichloromethyl-1,2,4-thiadiazol, which is sold under the tradename Terrazole®, by OHP Inc., USA, 2-amino 4-chloro 6-methyl pyrimidine (AM), 2-mercaptobenzothiazole (MBT), or 2-sulfanilamidothiazole (ST), and any combination thereof. In one aspect, a nitrification inhibitor can comprise DMPP, DCD, TU, nitrapyrin, 5-ethoxy-3-trichloromethyl-1,2,4-thiadiazol, AM, MBT or ST, or a combination thereof. In one aspect, the UCS fertilizer granule can comprise NBTPT, DMPP, TU, DCD, PPDA, nitrapyrin, 5-ethoxy-3-trichloromethyl-1,2,4-thiadiazol, AM, MBT, or ST or a combination thereof.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Processes to Prepare UCS Fertilizer Granules

Processes for making a UCS fertilizer granule of the present invention were performed or can be performed by using the system described in FIG. 1A, FIG. 1B, and FIGS. 1C and 1n Section A of the Detailed Description of the Invention. It was unexpectedly found that when UCS fertilizer granules are produced in a two-step method (e.g, conversion of urea and calcium sulfate to UCS adduct steps separate from granulation steps) a more stable and higher quality product is produced while avoiding the difficulties in achieving and maintaining the proper conditions needed for a single-step conversion/granulation process.

Ten batches of UCS fertilizer granules containing 27 wt. % nitrogen were produced under varied conditions to determine UCS adduct conversion rates. The weight ratio of urea to gypsum used was 1.38:1. Urea was supplied by 85 wt. % urea solution. Table 1 outlines the various conditions tested and the UCS adduct conversion rate. Samples 5 and 10 were not stored after mixing the reactants and were immediately granulated at 60 RPM. All other samples were stored overnight in an oven for drying after mixing the reactants but before the samples were ground and granulated using a granulation pan (60 RPM). All granulated products were stored in an oven for 24 hours immediately after granulation and further dried in an oven for one week at 40° C. before testing for UCS conversion rate. UCS conversion rate was determined using the procedure outlined in Malinowski et al., Preparation methods of calcium sulphate and urea adduct. *Pol. J. Chem. Tech.* 2007; 9(4):111-114).

TABLE 1

| Sample | Water Conc. | Temp. of Water Added | Reaction Temp. | Mixing Method | Conversion Rate | Density (g/ml) |
|---|---|---|---|---|---|---|
| 1 | 10 wt. % | 95° C. | 80° C. | Hand mix for 5 min. | 63.42% | 1.55 |
| 2 | 10 wt. % | 95° C. | 80° C. | Hand mix for 5 min. | 63.87% | 1.53 |
| 3 | 20 wt. % | 95° C. | 80° C. | Hand mix for 5 min. | 62.30% | 1.43 |
| 4 | 20 wt. % | 95° C. | 80° C. | Hand mix for 5 min. | 58.66% | 1.42 |
| 5 | 20 wt. % | 95 to 100° C. | 95 to 100° C. | Mix by mechanical granulator at 60 RPM for 15 min. and then granulated | 86.65% | 1.43 |
| 6 | 15 wt. % | | 90° C. | Hand mix for 5 min. | 86.85% | 1.50 |
| 7 | 15 wt. % | | 90° C. | Hand mix for 5 min. | 82.44% | 1.50 |
| 8 | 15 wt. % | | 90° C. | Hand mix for 5 min. | 83.70% | 1.45 |
| 9 | 15 wt. % | | 90° C. | Hand mix for 5 min. | 81.80% | 1.47 |
| 10 | 15 wt. % | | 90° C. | Mix by mechanical granulator at 60 RPM for 15 min. and then granulated | 83.11% | 1.45 |

It was observed that using the two-step process successfully produced UCS adduct and a UCS fertilizer granule while avoiding difficulties in achieving and maintaining the proper conditions needed for a single-step conversion/granulation process. Also, it was observed that granules with adduct conversion above 60% remain stable in long term storage and conversion above 40% will granulate sufficiently to provide robust product.

Example 2

Larger Scale Process for Producing UCS Fertilizer Granules

A larger scale process for producing UCS fertilizer granules having 27 wt. % nitrogen (N), 7.8 wt. % sulfur (S), and 9.5 wt. % calcium (Ca) can be performed as follows.

Step 1:

Continuously introduce 587 kg/metric ton of final UCS product (MT-UCS)/hr of solid urea prills, 423 kg/MT-UCS/hr anhydrous gypsum, 522 kg/MT-UCS/hr gypsum, and 224 kg/MT-UCS/hr of excess water (in the form of liquid or steam) into a granulation drum to form a slurry.

Mix the urea/gypsum slurry while heating to 60° C. to promote the conversion in the presence of excess water. The aim of the excess water is to avoid urea dust formation and to ensure the urea is in solution and fully available to convert with the gypsum. The granulation drum can be run at normal speed (e.g., 5-10 RPM) to mix/convert the urea/gypsum but not granulate. Steam can also be added to promote the conversion by heating of the mixture. Excess water can be added to target the moisture content of the drum of up to 20 wt. % and to obtain a wet consistency. Residence time in the drum depends on the raw material feed rates.

Continuously overflow the wet mix from the granulation drum to a dryer with the aim of drying the converted UCS to less than about 10 wt. % water but above 0.5 wt. % water. A granulator chute vibrator and dryer hammers can be used to remove the UCS mixture from the chute walls and dryer shell. The aim of drying can be to form a manageable semi-dry UCS "crumb" at the discharge of the dryer drum. The UCS "crumb" can be discharge to storage once it exits the dryer. The material can be sampled and checked for nutrients (N, S, and Ca), water content, and urea adduct conversion, etc.

Step 2:

A stockpile of UCS "crumb" can be granulated as a separate operation. The aim can be to granulate the UCS utilizing granulator steam and scrubber solution (such as 129 kg/MT-UCS/hr). If the UCS product is found to have nutrient levels that are slightly off specification, then minor adjustments in nutrient content can be achieved by adding fresh urea/gypsum as solid to the granulating UCS.

Dry the UCS granules using a rotary dryer to less than 0.5 wt. % water and screen for desired size. Cool to between ambient temperature+5° C. and ambient temperature−5° C., and coat with an oil.

In this example, to produce 20 MT/hr of UCS slurry, the following amounts are expected to be needed in the reaction vessel, 8.8 MT/hr of urea, 7.8 MT/hr of gypsum, and 3.4 MT/hr of excess water. A residence time in the reaction vessel of 12.6 minutes is expected to produce the desired UCS adduct.

Example 3

Characterization of the UCS Fertilizer Granules

Chemical analysis for nitrogen content can be determined by the Total Nitrogen in Fertilizer by Combustion Technique described in AOAC official Method 993.13.1996 (AOAC International). Calcium content can be determined by the Calcium by Atomic Absorption Spectrometric Method described in ISO 10084, 1992 (International Organization for Standardization). Sulfur content can be determined by the Gravimetric Barium Sulfate Method described in ISO 10084, 1992 (International Organization for Standardization).

The purity of the components can be cross-checked by NMR, HPLC, and LCMS analysis.

Granule size can be determined using standard sieve test methods. The granules are expected to be able to be produced in any size required for fertilizer applications, such as spherical granules having a diameter of between 5 mm and 5 cm.

Crush strength can be determined by a commercial compression tester (Chatillon Compression Tester). Individual granules between 2 to 4 mm in diameter can be placed on a mounted flat (stainless steel) surface and pressure applied by a flat-end rod (stainless steel) attached to the compression tester. A gauge mounted in the compression tester can measure the pressure (in kilograms) required to fracture the granule. At least 25 granules can be tested and the average of these measurements can be taken as the crush strength. (Ref. method #IFDC S-115 Manual for determining physical properties of fertilizer-IFDC 1993). It is expected that the formulation will have an acceptable crush strength (>2 kgf/granule).

The stability in soil and/or water, release rates, nitrogen volatilization, and nitrogen transformation (nitrification) can be measured in different soils and/or water and compared to other fertilizers and to products on the market. A soil that is representative of a broader class of soil types can be used to measure the properties of the fertilizer. Greenville soil and Crowley soil are two such representative soils. Other soils may also be used for the experiments described herein.

Nitrogen volatilization can be determined as the percentage of nitrogen loss via ammonia volatilization as compared to the amount of nitrogen applied or as the absolute mass of nitrogen lost via ammonia volatilization.

Benefits to crops can be determined and compared to other fertilizers and to products on the market. Non-limiting properties of the crop that can be tested include growth rate, root mass, head size, fruit size, grain size and mass, number of plants, number of fruits or grains, date to maturity, drought tolerance, heat and cold tolerance, yield, etc.

Surface and cross-sectional morphology of the UCS fertilizer granule of the present invention can be carried out using a scanning electron microscope (SEM). These morphology studies can be used to determine the properties of a coated or uncoated UCS fertilizer of the present invention.

Example 4

Compatibility

The stable UCS granules of the present invention have increased stability over urea and decreased production costs over other UCS granules that make the UCS granules of the present invention an attractive fertilizer product alone and in blended or compounded fertilizers. It is expected that the UCS granules will be compatible with a wide range of typical fertilizer raw materials such as DAP, MAP, urea, MOP, and SOP and more compatible than urea. Accordingly, the UCS granules can be used to provide a range of nitrogen-sulfur (NS), nitrogen-phosphorus-sulfur (NPS), and nitrogen-phosphorus-potassium-sulfur (NPKS) grades.

The invention claimed is:

1. A method of making a calcium sulfate urea (UCS) fertilizer granule, the method comprising:
    (a) combining urea, calcium sulfate, and water under conditions sufficient to form an aqueous slurry comprising a UCS adduct;
    (b) removing at least a portion of water from the aqueous slurry to form a partially dried material comprising the UCS adduct and storing the partially dried material without mixing for at least 2 hours; and
    (c) feeding the partially dried material into a granulator to form the UCS fertilizer granule.

2. The method of claim 1, wherein the method further comprises coating at least a portion of the UCS fertilizer granule.

3. The method of claim 2, wherein the UCS fertilizer granule is coated with a wax.

4. The method of claim 1, wherein the UCS fertilizer granule formed contains 40 wt. % to 90 wt. % UCS adduct.

5. The method of claim 4, wherein the UCS fertilizer granule formed contains 60 wt. % to 90 wt. % UCS adduct.

6. The method of claim 1, wherein step (a) is performed in a vessel different than the granulator from step (c).

7. The method of claim 1, wherein the partially dried material comprises 10 wt. % to 0.6 wt. % water.

8. The method of claim 1, wherein the UCS fertilizer granule formed comprises 0.5 wt. % water or less.

9. The method of claim 1, wherein step (b) comprises feeding the aqueous slurry from step (a) into a dryer to form the partially dried material.

10. The method of claim 1, wherein the aqueous slurry formed comprises greater than 10 wt. % to 25 wt. % water.

11. The method of claim 1, wherein step (b) comprises contacting the aqueous slurry with steam to heat the aqueous slurry.

12. The method of claim 1, wherein step (c) comprises contacting the partially dried material with steam to heat the partially dried material.

13. The method of claim 1, wherein forming the UCS fertilizer granule in the granulator further comprises combining the partially dried material with additional urea, calcium sulfate, and/or additional UCS adduct.

14. The method of claim 1, wherein forming the UCS fertilizer granule in the granulator further comprises contacting the partially dried material with a scrubber solution.

15. The method of claim 1, wherein step (b) comprises storing the partially dried material for 8 hours to 2 weeks before feeding the partially dried material into a granulator.

16. The method of claim 1, wherein a weight ratio of urea to calcium sulfate combined in step (a) is 1:1 to 3:1.

17. The method of claim 1, further comprising combining the UCS fertilizer granule with at least one additional fertilizer to form a fertilizer blend and/or compounded fertilizer.

* * * * *